United States Patent
Wen (10) Patent No.: US 9,742,774 B2
(45) Date of Patent: Aug. 22, 2017

(54) METHOD AND APPARATUS FOR DETERMINING PHISHING WEBSITE

(71) Applicant: Beijing Qihoo Technology Company Limited, Beijing (CN)

(72) Inventor: Ming Wen, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 98 days.

(21) Appl. No.: 14/438,160

(22) PCT Filed: Aug. 19, 2013

(86) PCT No.: PCT/CN2013/081760
§ 371 (c)(1),
(2) Date: Apr. 23, 2015

(87) PCT Pub. No.: WO2014/063520
PCT Pub. Date: May 1, 2014

(65) Prior Publication Data
US 2015/0281244 A1 Oct. 1, 2015

(30) Foreign Application Priority Data
Oct. 25, 2012 (CN) .......................... 2012 1 0413907

(51) Int. Cl.
*G06F 17/00* (2006.01)
*H04L 29/06* (2006.01)

(52) U.S. Cl.
CPC ........ *H04L 63/101* (2013.01); *H04L 63/1483* (2013.01); *H04L 63/20* (2013.01)

(58) Field of Classification Search
CPC .................................................. H04L 63/1483
(Continued)

(56) References Cited

U.S. PATENT DOCUMENTS 7,457,823 B2 * 11/2008 Shraim ................. H04L 12/585
8,631,498 B1 * 1/2014 Hart ....................... H04L 63/145
726/22
(Continued)

FOREIGN PATENT DOCUMENTS

CN 102638448 8/2012
CN 102647408 8/2012
(Continued)

OTHER PUBLICATIONS

Liang, Xue-song; "Techniques of Detecting Phishing Sites Based on Browser"; Dept. of Physics, Sichuan College of Education, Chengdu Sichuan 610041, China; 2007; pp. 53-55.

*Primary Examiner* — Morshed Mehedi
*Assistant Examiner* — Khalil Naghdali
(74) *Attorney, Agent, or Firm* — Harness, Dickey & Pierce, P.L.C.

(57) ABSTRACT

Disclosed are a method and an apparatus for determining a phishing website. The method comprises: a server determining whether a target website accessed by a client is a gray website, the gray website being a website neither in a preset blacklist nor in a whitelist; the client acquiring the browsing information of the gray website in the local client, and determining whether the browsing information meets a preset condition; if yes, determining that the gray website is a non-phishing website; if not, the client acquiring the domain name feature information of the gray website, and when the domain name feature information conforms to a pre-configured rule, determining that the gray website is a phishing website. Through the present disclosure, when the server cannot determine whether the website accessed by the client is a phishing website, or when the server fails, the latest generated phishing website can be intercepted the first
(Continued)

time at the client, and most of the phishing websites can be intercepted, thereby ensuring the network security.

16 Claims, 4 Drawing Sheets

(58) Field of Classification Search
USPC .......................................................... 726/26
See application file for complete search history.

(56) References Cited

U.S. PATENT DOCUMENTS

| | | | |
|---|---|---|---|
| 2006/0123464 A1* | 6/2006 | Goodman | H04L 63/1416 726/2 |
| 2009/0089859 A1 | 4/2009 | Cook et al. | |
| 2013/0086636 A1* | 4/2013 | Golovanov | G06F 21/56 726/3 |
| 2014/0007238 A1* | 1/2014 | Magee | G06F 21/577 726/24 |

FOREIGN PATENT DOCUMENTS

| | | |
|---|---|---|
| CN | 102710645 | 10/2012 |
| CN | 102710646 | 10/2012 |
| CN | 102724186 | 10/2012 |
| CN | 102957693 | 3/2013 |
| CN | 102957694 | 3/2013 |

\* cited by examiner

METHOD AND APPARATUS FOR DETERMINING PHISHING WEBSITE

FIELD OF THE INVENTION

The present disclosure relates to the field of network security technology, and in particular to a method and an apparatus for determining a phishing website.

BACKGROUND OF THE INVENTION

Generally, a phishing website has the following features. 1. Tricking a user by winnings (winnings from qq, winnings from microblogging, hitting a golden egg, the Avenue of Stars, etc.). 2. Tricking a user by a low price (of an Airline ticket, merchandise on Taobao). 3. A low production cost. The phishing website can be produced in batch and use a free sub domain name, and the cost of a phishing website can be negligible compared to the production and spread of a virus. 4. Serious consequences. The phishing website mostly tricks the user into purchasing merchandise (e.g. an Airline ticket, a single lens reflex camera, etc.) of a relatively high price, and some phishing websites can steal the user's Alipay and bank account, which will cause a great loss to the user.

The methods of the existing identification technology for a phishing website are mainly as follows. 1. By performing a character string matching of the key content of a webpage. For example, detecting whether there are words of 'Taobao', 'winnings', etc. in the title and keywords of the webpage. 2. By performing an image recognition. Some phishing websites imitate official websites of brands and the pages look just like the official websites, for example, imitate some airline companies and Taobao. 3. From domain name information. The phishing website usually uses a domain name registered relatively recently, and often uses a free sub domain name. The phishing website will be recognized by combining the several methods as mentioned above and finally a blacklist will be formed. In addition to the blacklist, in order to avoid a false alarm, there will be a mechanism of a whitelist, and a website which has been accessed by a large quantity and was once raised a false alarm will be added into the whitelist.

The recognition of the phishing website by the existing antivirus software is performed at a server: When a client accesses a website, the antivirus software sends a request to the server at the same time to inquire whether this website is a phishing website. If the website is a phishing website, it is intercepted, otherwise it is allowed. Such technical solution has two obvious drawbacks: one is that a newly generated phishing website is not recorded by the server, and all the results of the inquiries by a client are unknown; the other is that when a technical failure, etc. occurs at the server, which causes a longer inquiry time, there may be a missing report. With regards to the intercepting of a phishing website, the former drawback is very difficult to be avoided, because the production cost of a phishing website is very low, a free sub domain is often used, and after several users were tricked, the original domain name would be abandoned, the content such as the title would be amended and then a new domain name would be applied to continue to trick others.

One of the problems to be solve urgently by the present disclosure is to provide a method and an apparatus for determining a phishing website so that when the server cannot determine whether the website accessed by a client is a phishing website, or when the server fails, the latest generated phishing website can be intercepted the first time at the client, and most of the phishing websites can be intercepted, thereby ensuring the network security.

SUMMARY OF THE INVENTION

In view of the above described problem, the present disclosure is made in order to provide a method for determining a phishing website and a corresponding apparatus for determining a phishing website for overcoming the above described problem or at least partly solving or alleviating the above described problem.

An aspect of the present disclosure provides a method for determining a phishing website, comprising:
determining, by a server, whether a target website accessed by a client is a gray website, the gray website being a website neither in a preset blacklist nor in a whitelist;
acquiring, by the client, browsing information of the gray website in the local client, and determining whether the browsing information meets a preset condition;
if yes, determining that the gray website is a non-phishing website;
if not, acquiring, by the client, the domain name feature information of the gray website, and when the domain name feature information conforms to a pre-configured rule, determining that the gray website is a phishing website.

Another aspect of the present disclosure provides an apparatus for determining a phishing website, comprising:
a gray website determining module at a server, for determining whether a target website accessed by a client is a gray website, the gray website being a website neither in a preset blacklist nor in a whitelist;
a phishing website determining module at the client, for acquiring the browsing information of the gray website in the local client, and determining whether the browsing information meets a preset condition;
a first determining module at the client, for determining that the gray website is a non-phishing website;
a second determining module at the client, for acquiring domain name feature information of the gray website, and when the domain name feature information conforms to a pre-configured rule, determining that the gray website is a phishing website.

A further aspect of the present disclosure provides a computer program, comprising computer readable codes, when the computer readable codes are run on a server, cause the server to execute the aforesaid method for determining a phishing website.

A still further aspect of the present disclosure provides a computer readable medium, in which the aforesaid computer program is stored.

The beneficial effect of the present disclosure is:
According to the method and an apparatus for determining a phishing web site of the present disclosure, it can be determined by a client whether the gray website is a phishing website, thereby obtaining the beneficial effects that when the server cannot determine whether the website accessed by the client is a phishing website, or when the server fails, the latest generated phishing website can be intercepted the first time at the client, and most of the phishing websites can be intercepted, thereby ensuring the network security.

The above explanation is merely a summary of the technical solution of the present disclosure. In order to understand the technical means of the present disclosure more clearly, which can be carried out according to the contents of the specification, and in order to understand the above described and other objects, features and advantages of the present disclosure more obviously and easily, specific embodiments of the present disclosure will be described below.

BRIEF DESCRIPTION OF DRAWINGS

By reading the following detailed description of the preferred embodiments, various other advantages and benefits will be clear for those ordinary skilled in the art. The drawings are merely used for the purpose of illustration of the preferred embodiments and are not considered as limiting of the present disclosure. Further, the same components will be denoted by the same reference symbol. In the drawings.

DETAILED DESCRIPTION OF THE INVENTION

Hereinbelow, the present disclosure will be further described in combination with the drawings and the specific embodiments.

One of the core ideas of the embodiments of the present disclosure lies in that when the server cannot determine whether the website accessed by the client is a phishing website, or when the server fails, upon comparison of the browsing information by the user and the domain name feature information of the website with the browsing information in the local client, it will be comprehensively determined whether a gray website is a phishing website.

Figure 1:
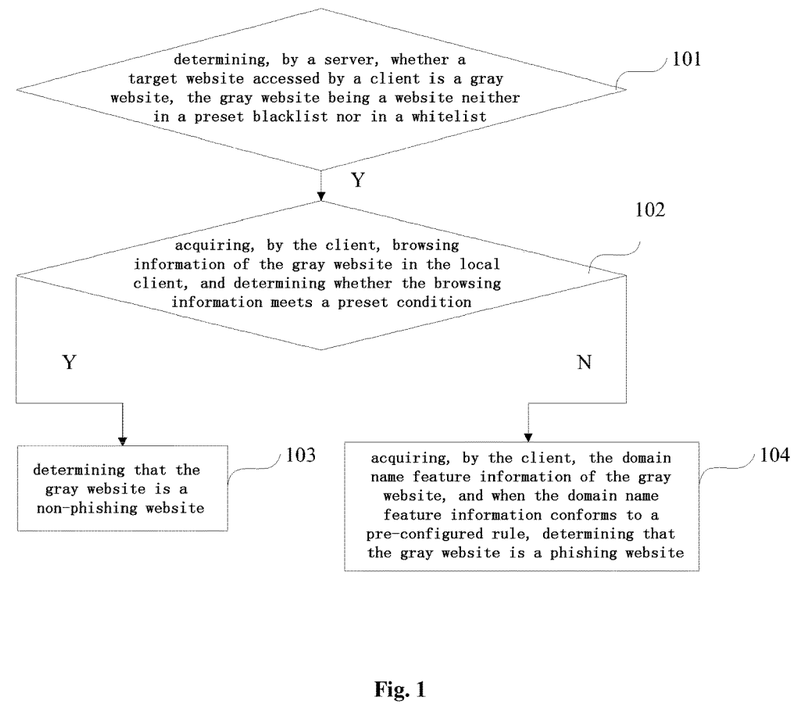
FIG. 1 schematically shows a flowchart of the method for determining a phishing website according to an embodiment of the present disclosure.

FIG. 1 shows a flowchart of the steps of a method embodiment for determining a phishing website according to an embodiment of the present disclosure, which can specifically include the following steps:

A step 101, in which a server determines whether a target website accessed by a client is a gray website, the gray website being a website neither in a preset blacklist nor in a whitelist;

In a specific implementation, a blacklist in which known phishing websites are stored and a whitelist in which known non-phishing website are stored can be set in the server. In one preferred embodiment of the present disclosure, the step 101 can specifically include following sub-steps:

A sub-step S11, in which the client accesses the target website and sends a request to the server to inquire whether the target website is a phishing website;

A sub-step S12, in which the server receives the request, checks whether the target website is in the blacklist or the whitelist, and if the target website is neither in the blacklist nor in the whitelist, determines that the target website is a gray website.

In practice, when the client accesses the target website, the request to inquire whether the target website is a phishing website can be sent to a server at the same time, and the server checks whether the target website exists in the blacklist or the whitelist after receiving the inquiry request, and if the target website is neither in the blacklist nor in the whitelist, determines that the target website is a gray website. Then the server returns the result of determining as a gray website to the client and then the client initiates a heuristic determination.

A step 102, in which the client acquires the browsing information of the gray website in the local client, and determines whether the browsing information meets a preset condition;

As one example of a specific implementation of the embodiment of the present disclosure, the browsing information can include page views and viewing time, and the step 102 can include a following step in which:

It is determined whether the page views is higher than a preset threshold and whether the viewing time is in a preset time range.

In a specific implementation, two principle APIs can be configured at the client. One is an API for transferring a URL of the target website and this API can be called through a browser or a security software when a user accesses an unknown target website. The other is an API for inquiry, which can transfer the target website to inquire whether the target website is a phishing website. When the client initiates a heuristic determination, the API for transferring the URL of the target website will be called, a host, IP, a website name, the page views and the viewing time of the gray website will be recorded in a data buffer and ranking will be performed in accordance with the page views. As one example, an algorithm for ranking can be a LRU (Least Recently Used), the host of the gray website frequently accessed recently will be saved. When the website accessed by the user is a gray website, the API for inquiry will be called, then the client inquires the data of the ranked page views, and if it is found there is a record and the page views is higher than a preset threshold, it is determined that it is a white website and the client allows to access this website. The data of all the gray websites are stored in the data buffer and the websites are ranked by the LRU, and a website which is not accessed in a preset time will be deleted from the data buffer. The preset threshold for determining a phishing website can be adjusted according to the statistics of the server and the range may be probably above 10.

A step 103, in which if yes, it is determined that the gray website is a non-phishing website;

When it is determined that the gray website accessed by the user is a non-phishing website, the client allows to access the gray website.

A step 104, in which if not, the client acquires domain name feature information of the gray web site, and when the domain name feature information conforms to a pre-configured rule, determines that the gray website is a phishing website.

In one preferred embodiment of the present disclosure, the domain name feature information of the gray website includes an IP address, a domain name and a website name. The step 104 can be the following step in which:

When the IP address of the gray website is a foreign IP, the gray web site adopts a pre-configured suspicious domain name, and the website name of the gray website contains a pre-configured sensitive word, it is determined that the gray website is a phishing website.

In a specific implementation, when a user accesses a gray website, the client inquires the page views ranked in the data buffer. If it is founded that there is a record of the gray website, but the page views is lower than the preset threshold, or there is no record of the gray website, it will be comprehensively determined whether the gray website is a phishing website according to whether the IP address of the gray website is a foreign IP, whether the host uses a highly risky sub domain name, and whether the website name contains the pre-configured sensitive word.

If the IP address of the gray website is a foreign IP, and the website adopts a pre-configured suspicious domain name (e.g., tk, co.cc, etc., which can be updated from the server periodically), and the website name contains a pre-configured sensitive word (e.g., Taobao, phone bill, lucky draw, lottery, etc., which can be updated from the server periodically), it is considered that the gray website is a phishing website. When it is determined that the gray website accessed by the user is a phishing website, then the client refused to access the gray website.

In one preferred embodiment of the present disclosure, the following step also can be included, in which:

When the domain name feature information of the gray website conforms to at least any two items from that the IP address of the gray website is a foreign IP, the gray website adopts a pre-configured suspicious domain name, and the website name of the gray website contains a pre-configured sensitive word, prompt information is generated which shows that the target website is a suspected phishing website.

If the IP address of the gray website is a foreign IP, or the website adopts a pre-configured suspicious domain name, or the website name contains a pre-configured sensitive word, it will be prompted that the gray website which conforms to at least two of the above conditions is a suspected phishing website. In this way the false alarm can be reduced, because in practice some small websites will use free sub domains to set up servers, which may all hit the three rules.

In a specific implementation, a log will be generated from a processing result of allowing or refusing by the client to access the gray website, or of generating the information that the target website is a suspected phishing website and returned to the server. The client will intercept the phishing website, and if the gray website is not a phishing website, will allow to continue to access. A log will be generated from the processing result of allowing or refusing by the client to access the gray website, or of generating the information that the target website is a suspected phishing website and returned to the server. If there is a false alarm, it can be added into the whitelist from the server.

In one preferred embodiment of the present disclosure, the server can be a controlling server in an Intranet and the client can be a client in the Intranet. As an example of one specific application, the embodiment of the present disclosure can be applied into phishing website identification in the Intranet, so as to enhance the security of an enterprise network. Specifically, in an application to the Intranet, the embodiment of the present disclosure can include the following steps of:

A step S1, in which the controlling server in the Intranet determines whether a target website accessed by the client in the Intranet is a gray website, the gray website being a website neither in a preset blacklist nor in a whitelist;

A step S2, in which the client in the Intranet acquires the browsing information of the gray website in the local client in the Intranet, and determines whether the browsing information meets a preset condition;

A step S3, in which if yes, it is determined that the gray website is a non-phishing website;

A step S4 in which if not, the client in the Intranet acquires the domain name feature information of the gray website, and when the domain name feature information conforms to a pre-configured rule, determines that the gray website is a phishing website.

For the above described example, since it is substantially similar to the method embodiment of FIG. 1, those that are not detailed in the description of the present example can refer to the relevant explanation in the method embodiment, which will not be repeated here.

It should be noted that, for the method embodiment, for a simple description, it is expressed as the combination of a series of actions. However, it should be understood by those skilled in the art, that the present disclosure will not be limited by the sequence of the actions described, because depending on the present disclosure, certain steps can be performed by using another sequence or at the same time. Secondly, it should be also understood by those skilled in the art, that the embodiments described in the specification all belong to the preferred embodiments, and the involved actions and modules may not necessarily be required by the present disclosure.

Figure 2:
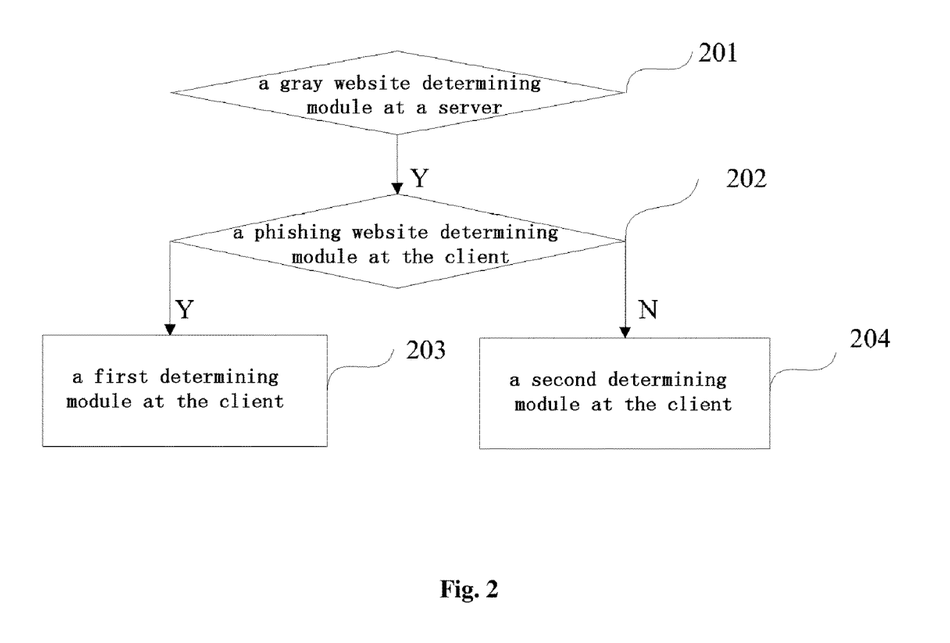
FIG. 2 schematically shows a block diagram of the apparatus for determining a phishing website according to an embodiment of the present disclosure.

FIG. 2 shows a block diagram of a structure of the apparatus embodiment for determining a phishing website according to an embodiment of the present disclosure, which can specifically comprise the following modules:

A gray website determining module 201 at a client, for determining whether the target web site accessed by the client is a gray website, the gray website being a website neither in a preset blacklist nor in a whitelist;

In one preferred embodiment of the present disclosure, the server comprises a blacklist in which known phishing websites are stored and a whitelist in which known non-phishing website are stored. The gray website determining module 201 can comprise the following sub-modules:

An accessing sub-module at the client, for accessing the target website and sending a request to the server to inquire whether the target website is a phishing website;

A determining sub-module at the server, for receiving the request, checking whether the target web site is in the blacklist or the whitelist, and if the target website is neither in the blacklist nor in the whitelist, determining that the target website is a gray website.

A phishing website determining module 202 at the client, for acquiring the browsing information of the gray website in the local client, and determining whether the browsing information meets a preset condition;

In one preferred embodiment of the present disclosure, the phishing website determining module 202 can be:

A browsing information determining module, for determining whether the page views is higher than a preset threshold and whether the browsing time is in a preset time range.

A first determining module 203 at the client, for determining that the gray website is a non-phishing website;

A allowing access module, for allowing by the client to access the gray website if the gray website is a non-phishing website.

A second determining module 204 at the client, for acquiring the domain name feature information of the gray website, and when the domain name feature information conforms to a pre-configured rule, determining that the gray website is a phishing website.

In one preferred embodiment of the present disclosure, the domain name feature information of the gray website includes an IP address, a domain name and a website name. The second determining module 204 can be:

A domain name feature information determining module, for determining that the gray website is a phishing website when the IP address of the gray website is a foreign IP, the gray website adopts a pre-configured suspicious domain name, and the website name of the gray website contains a pre-configured sensitive word.

A refusing access module, for refusing by the client to access the gray website if the gray website is a phishing website, In one preferred embodiment of the present disclosure, the apparatus also comprises:

A information prompting module, for generating prompt information that the target website is a suspected phishing website when the domain name feature information of the gray website conforms to at least any two items from that the IP address of the gray website is a foreign IP, the gray website adopts a pre-configured suspicious domain name, and the website name of the gray website contains a pre-configured sensitive word.

A processing result returning module, for generating a log from a processing result of allowing or refusing by the client to access the gray website, or of generating the information that the target website is a suspected phishing website and returning to the server.

For the apparatus embodiment of FIG. 2, since it is substantially similar to the method embodiment of FIG. 1, it is described briefly, and those relevance can refer to the relevant explanation in the method embodiment.

In one preferred embodiment of the present disclosure, the server can be a controlling server in an Intranet and the client can be a client in the Intranet. As an example of one specific implementation, the embodiment of the present disclosure also can be applied into phishing website identification in the Intranet, so as to enhance the security of an enterprise network. Specifically, in an implementation environment of the Intranet, the embodiment of the present disclosure can comprise the following modules:

A gray web site determining module at a controlling server in an Intranet, for determining whether a target website accessed by the client in an Intranet is a gray website, the gray website being a website neither in a preset blacklist nor in a whitelist;

A phishing website determining module at the client in the Intranet, for acquiring the browsing information of the gray website in the local client in the Intranet, and determining whether the browsing information meets a preset condition;

A first determining module at the client in the Intranet, for determining that the gray website is a non-phishing website;

A second determining module at the client in the Intranet, for acquiring the domain name feature information of the gray website, and when the domain name feature information conforms to a pre-configured rule, determining that the gray website is a phishing website.

For the above described examples, those that are not described in details can refer to the relevant explanation in the method embodiment, which will not be repeated here.

The respective components of the embodiments of the present disclosure can be implemented in hardware, or implemented in a software module running on one or more processors, or implemented in combination thereof. It should be understood by those skilled in the art, that in practice a microprocessor or a digital signal processor (DSP) can be used to implement some or all functions of some or all components in the apparatus for determining a phishing website according to the embodiments of the present disclosure. The present disclosure can also be implemented as a device or apparatus program (e.g., a computer program and a computer program product) for executing some of all of the method described here. Such a program for implementing the present disclosure can be stored on a computer readable medium or can have a form of one or more signals. Such a signal can be downloaded from an Internet website or provided on a carrying signal or provided in any other form.

Figure 3:
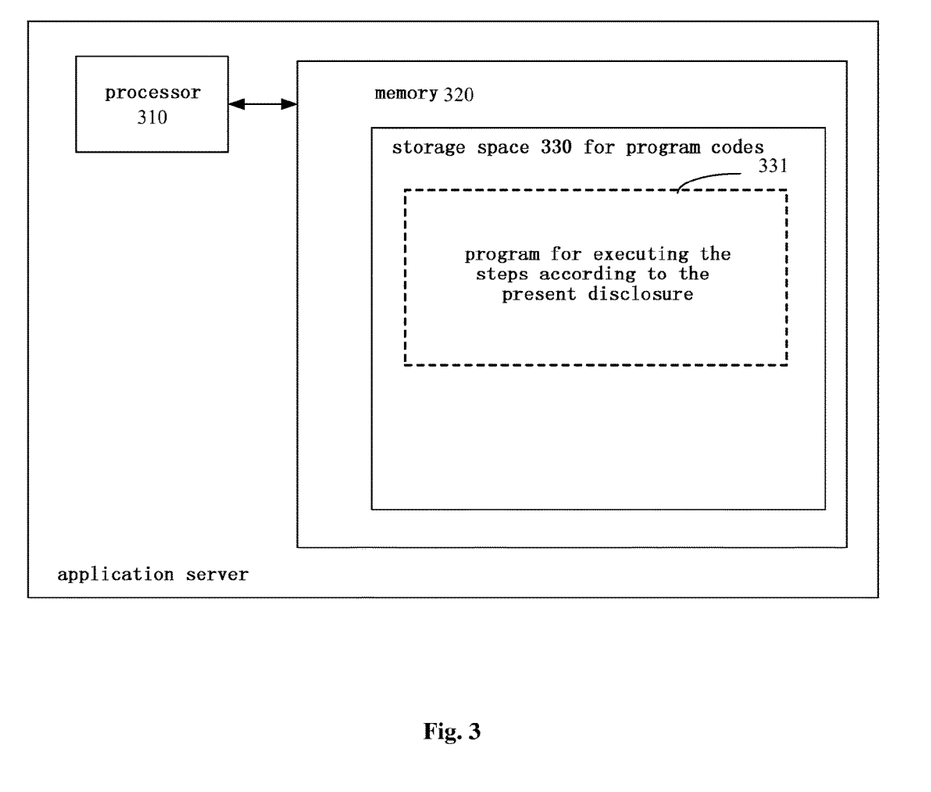
FIG. 3 schematically shows a block diagram of the server for performing the method according to the present disclosure.
Figure 4:
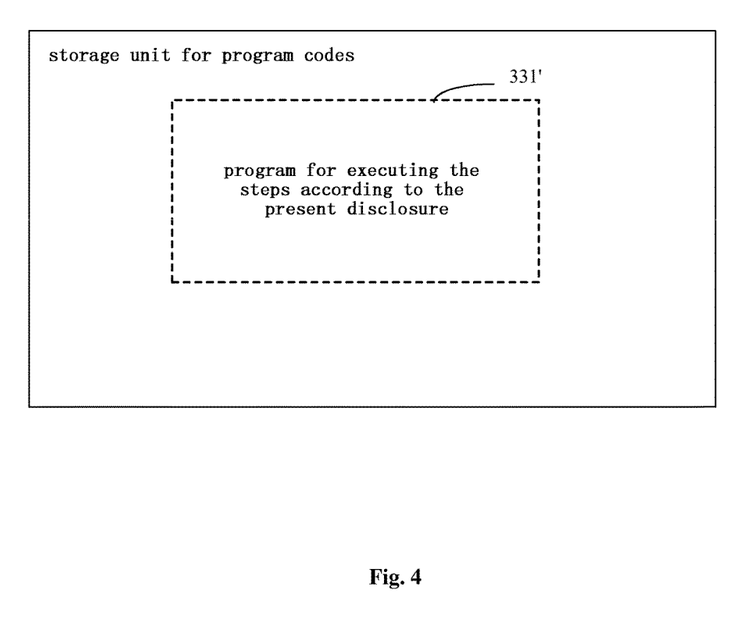
FIG. 4 schematically shows a storage unit for holding or carrying the program codes for realizing the method according to the present disclosure.

For example, FIG. 3 shows a server such as an application server which can implement the method for determining a phishing website according to the present disclosure. Conventionally, the server includes a processor 310 and a computer program product or a computer readable medium in a form of a memory 320. The memory 320 can be an electronic memory such as a flash memory, an EEPROM (electrical erasable, programmable read only memory), an EPROM, a hard disk or a ROM. The memory 320 has a storage space 330 for program codes 331 for executing any step in the above described method. For example, the storage space 330 for the program codes can include the respective program codes 331 for respectively implementing various steps in the above method. These program codes can be read out from one or more computer program product or written into the one or more computer program product. These computer program products include a program code carrier such as a hard disk, a Compact Disc (CD), a memory card or a floppy disk. Such computer program products are usually the portable or stationary storage unit as described with reference to FIG. 4. The storage unit can have a storage section, a storage space, etc., arranged similarly to the memory 320 in the server of FIG. 3. The program codes can be compressed e.g. in a suitable way. Generally, the storage unit includes computer readable codes 331', namely codes that can be read for example by a processor such as 310. When run by the server, these codes cause the server to execute each step in the method described above.

"One embodiment", "a embodiment" or "one or more embodiments" referred to in the specification means, that a specific feature, structure or character described in connection with the embodiments is included in at least one embodiment of the present disclosure. Moreover, it should be noted that, a phrase example of "in one embodiment" here does not necessarily all refer to the same embodiment.

In the specification provided here, a number of specific details are explained. However, it can be understood that, the embodiments of the present disclosure can be practiced without these specific details. In some embodiments, the well-known method, structure and technology have not been illustrated in details, so as not to obscure the understanding of the specification.

It should be noted that, the above described embodiments are used for explaining the present disclosure, rather than limiting the present disclosure, and an alternative embodiment can be designed by those skilled in the art without departing from the scope of the appended claims. In the claims, any reference symbol positioned between parentheses should not be considered the limiting of the claims. The word "include" or "comprise" does not exclude the existence of a element or a step that is not defined in the claims. The word "a" or "an" positioned before an element does not exclude the existence of a plurality of such elements. The present disclosure can be implemented by way of a hardware comprising several different elements and by way of a computer suitably programmed. In an unit claim enumerating several apparatuses, several of these apparatuses can be specifically implemented by the same hardware. The use of the word "first", "second" and "third", etc. does not represent any sequence. These words can be construed as a name.

Furthermore, it also should be noted that, the expressions used in the specification are principally selected for the purpose of readability and teaching, are not selected for interpreting or limiting the subject matter of the present disclosure. Therefore, many modifications and alteration are all obvious for those ordinary skilled in the art, without departing from the scope and spirit of the appended claims. For the scope of the present disclosure, the disclosure of the present disclosure is illustrative, not for limitation, and the scope of the present disclosure is limited by the appended claims.

What is claimed is:

1. A method for determining a phishing website, comprising:
   determining, by a hardware server, whether a target website accessed by a client is a gray website, the gray website being a website neither in a preset blacklist nor in a whitelist;
   acquiring, by the client, browsing information of the gray website in the client, and determining whether the browsing information meets a preset condition;
   if yes, determining that the gray website is a non-phishing website;
   if not, acquiring, by the client, domain name feature information of the gray website, and when the domain name feature information conforms to a pre-configured rule, determining, by the client, that the gray website is a phishing website,
   wherein the browsing information includes a number of page views and viewing time, and
   wherein the client is a local client and further comprises:
   a first API configured for: (1) transferring a URL of the target website in response to a heuristic determination being initiated by the client; (2) storing the browsing information; and (3) ranking websites based on the browsing information; and
   a second API configured for determining whether the target website is the phishing website based on ranked page views and the viewing time.

2. The method according to claim 1, wherein the server hardware includes a blacklist in which known phishing websites are stored and a whitelist in which known non-phishing website are stored, determining, by the hardware server, whether the target website accessed by the client is a gray website includes:
   accessing, by the client, the target website and sending a request to the hardware server to inquire whether the target website is a phishing website;
   receiving, by the hardware server, the request, checking whether the target website is in the blacklist or the whitelist, and if the target website is neither in the blacklist nor in the whitelist, determining that the target website is a gray website.

3. The method according to claim 1, wherein the step of determining whether the browsing information meets the preset condition is:
   determining whether the page views is higher than a preset threshold and whether the viewing time is in a preset time range.

4. The method according to claim 1, wherein the domain name feature information of the gray website includes an IP address, a domain name and a website name, and acquiring, by the client, the domain name feature information of the gray website, and when the domain name feature information conforms to the preconfigured rule, determining that the gray website is a phishing website:
   when the IP address of the gray website is a foreign IP, the gray website adopts a pre-configured suspicious domain name, and the website name of the gray website contains a pre-configured sensitive word, determining that the gray website is a phishing website.

5. The method according to claim 4, further comprising:
   when the domain name feature information of the gray website conforms to at least any two items from that the IP address of the gray website is a foreign IP, the gray website adopts a pre-configured suspicious domain name, and the website name of the gray website contains a pre-configured sensitive word, generating prompt information that the target website is a suspected phishing website.

6. The method according to claim 1, further comprising:
   if the gray website is a non-phishing website, allowing, by the client, to access the gray website;
   if the gray website is a phishing website, refusing, by the client, to access the gray website.

7. The method according to claim 5, further comprising:
   generating a log from a processing result of allowing or refusing by the client to access the gray website, or of generating the information that the target website is a suspected phishing website, and returning to the hardware server.

8. The method according to claim 1, wherein the hardware server is a controlling hardware server in an Intranet and the client is a client in the Intranet.

9. An apparatus for determining a phishing website, comprising:
   one or more non-transitory computer readable medium configured to store computer-executable instructions;
   at least one processor to execute a plurality of software modules configured to execute the computer-executable instructions to cause:
   determining, at a hardware server, whether a target website accessed by a client is a gray website, the gray website being a website neither in a preset blacklist nor in a whitelist;
   acquiring, at a client, browsing information of the gray website in the client, and determining whether the browsing information meets a preset condition;
   determining, at the client, that the gray website is a non-phishing website when the browsing information meets the preset condition;
   acquiring, at the client, domain name feature information of the gray website, and when the domain name feature information conforms to a pre-configured rule, determining, by the client, that the gray website is a phishing website,
   wherein the browsing information includes a number of page views and viewing time, and
   wherein the client is a local client and further comprises:
   a first API configured for: (1) transferring a URL of the target website in response to a heuristic determination being initiated by the client; (2) storing the browsing information; and (3) ranking the websites based on the browsing information; and
   a second API configured for determining whether the target website is the phishing website based on the ranked page views and the viewing time.

10. The apparatus according to claim 9, wherein the hardware server comprises a blacklist in which known phishing websites are stored and a whitelist in which known non-phishing website are stored, and the processor executes at least one of the software modules configured to execute the computer-executable instructions to cause:
    accessing, at the client, the target website and sending a request to the hardware server to inquire whether the target website is a phishing website;

receiving, at the hardware server, the request, checking whether the target website is in the blacklist or the whitelist, and if the target website is neither in the blacklist nor in the whitelist, determining that the target website is a gray website.

11. The apparatus according to claim 9, wherein the processor executes at least one of the software modules configured to execute the computer-executable instructions to cause:

determining whether page views is higher than a preset threshold and whether viewing time is in a preset time range.

12. The apparatus according to claim 9, wherein the domain name feature information of the gray website includes an IP address, a domain name and a website name the processor executes at least one of the software modules configured to execute the computer-executable instructions to cause:

determining that the gray website is a phishing website when the IP address of the gray website is a foreign IP, the gray website adopts a pre-configured suspicious domain name, and the website name of the gray website contains a pre-configured sensitive word.

13. The apparatus according to claim 12, wherein the processor further executes one or more software modules configured to execute the computer-executable instructions to cause:

generating prompt information that the target website is a suspected phishing website when the domain name feature information of the gray website conforms to at least any two items from that the IP address of the gray website is a foreign IP, the gray website adopts a pre-configured suspicious domain name, and the website name of the gray website contains a pre-configured sensitive word.

14. The apparatus according to claim 9, wherein the processor further executes one or more software modules configured to execute the computer-executable instructions to cause:

refusing, at the client, to access the gray website if the gray website is a phishing website;

allowing, at the client, to access the gray website if the gray website is a non-phishing website.

15. The apparatus according to claim 12, wherein the processor further executes one or more software modules configured to execute the computer-executable instructions to cause:

generating a log from a processing result of allowing or refusing at the client to access the gray website, or of generating the information that the target website is a suspected phishing website and returning to the hardware server.

16. A non-transitory computer readable medium having instructions stored thereon that, when executed by at least one processor, cause the at least one processor to perform operations for determining a phishing website, which comprises steps of:

determining, by a hardware server, whether a target website accessed by a client is a gray website, the gray website being a website neither in a preset blacklist nor in a whitelist;

acquiring, by the client browsing information of the gray website in the client, and determining whether the browsing information meets a preset condition;

if yes, determining that the gray website is a non-phishing website;

if not, acquiring, by the client, domain name feature information of the gray website, and when the domain name feature information conforms to a pre-configured rule, determining, by the client, that the gray website is a phishing website, wherein the browsing information includes a number of page views and viewing time, and wherein the client is a local client and further comprises:

a first API configured for: (1) transferring a URL of the target website in response to a heuristic determination being initiated by the client; (2) storing the browsing information; and (3) ranking the websites based on the browsing information; and a second API configured for determining whether the target website is the phishing website based on the ranked page views and the viewing time.

* * * * *